US010634118B2

(12) United States Patent
Runge et al.

(10) Patent No.: US 10,634,118 B2
(45) Date of Patent: Apr. 28, 2020

(54) METHOD FOR OPERATING A WIND TURBINE HAVING A ROTOR BLADE HEATING DEVICE

(71) Applicant: Nordex Energy GmbH, Hamburg (DE)

(72) Inventors: Ines Runge, Henstedt-Ulzburg (DE); Danela Jacob, Norderstedt (DE)

(73) Assignee: Nordex Energy GmbH, Hamburg (DE)

( * ) Notice: Subject to any disclaimer, the term of this patent is extended or adjusted under 35 U.S.C. 154(b) by 1229 days.

(21) Appl. No.: 14/849,137

(22) Filed: Sep. 9, 2015

(65) Prior Publication Data

US 2016/0084231 A1 Mar. 24, 2016

(30) Foreign Application Priority Data

Sep. 19, 2014 (EP) .................................. 14185606

(51) Int. Cl.
| | | |
|---|---|---|
| *F03D 7/04* | (2006.01) | |
| *F03D 80/40* | (2016.01) | |
| *F03D 7/00* | (2006.01) | |
| *F03D 17/00* | (2016.01) | |

(52) U.S. Cl.
CPC ............... *F03D 7/042* (2013.01); *F03D 7/00* (2013.01); *F03D 17/00* (2016.05); *F03D 80/40* (2016.05); *F05B 2260/821* (2013.01); *F05B 2270/325* (2013.01); *F05B 2270/327* (2013.01); *F05D 2260/20* (2013.01); *Y02E 10/723* (2013.01)

(58) Field of Classification Search
CPC . F03D 17/00; F03D 7/00; F03D 7/042; F03D 80/40; F03D 1/0675; F03D 7/0264; F03D 7/045; F03D 7/048; F03D 80/60; F05B 2260/821; F05B 2270/325; F05B 2270/327; F05B 2260/20; F05B 2270/32; F05B 2270/335; F05D 2260/20; Y02E 10/723; Y02E 10/721; Y02E 10/722
USPC ........................... 416/146, 1, 146 R; 290/44
See application file for complete search history.

(56) References Cited

U.S. PATENT DOCUMENTS

| | | |
|---|---|---|
| 7,182,575 B2 | 2/2007 | Grabau |
| 8,558,401 B2 | 10/2013 | Girardin |
| 9,041,233 B2 | 5/2015 | Ramos et al. |
| 9,394,884 B2 | 7/2016 | Laurberg |

(Continued)

FOREIGN PATENT DOCUMENTS

| | | |
|---|---|---|
| DE | 102010015595 A1 | 10/2011 |
| DE | 102013223568 A1 | 5/2015 |

(Continued)

OTHER PUBLICATIONS

Hahn, Ulrich: "Waermetransport", Physik fuer Ingenieure, 2007, ISBN 978-3-486-27520-9, XP055481202, pp. 320 to 343.

*Primary Examiner* — Patrick Hamo
*Assistant Examiner* — Paul W Thiede
(74) *Attorney, Agent, or Firm* — Walter Ottesen, P.A.

(57) ABSTRACT

A method for operating a wind turbine includes determining a current temperature of a rotor blade and activating and deactivating a rotor blade heating device in dependence upon the determined current temperature. The current temperature is determined by assuming a temperature starting value and calculating a change in temperature taking into account at least one predefined characteristic variable for the temperature behavior of the rotor blade and at least one operating parameter of the wind turbine.

17 Claims, 3 Drawing Sheets

(56) References Cited

U.S. PATENT DOCUMENTS

| | | |
|---|---|---|
| 9,759,193 B2 | 9/2017 | Jepsen |
| 2010/0224621 A1 | 9/2010 | Mortensen |
| 2013/0177416 A1* | 7/2013 | Renschler ............... F03D 80/40 416/1 |
| 2015/0023792 A1* | 1/2015 | Spitzner ................ F03D 80/40 416/1 |

FOREIGN PATENT DOCUMENTS

| | | |
|---|---|---|
| EP | 0249947 A1 | 12/1987 |
| EP | 2615301 A1 | 7/2013 |
| EP | 2 626 557 A1 | 8/2013 |
| EP | 2631476 A2 | 8/2013 |
| EP | 2719624 A1 | 4/2014 |
| WO | 2014/114295 A1 | 7/2014 |

* cited by examiner

METHOD FOR OPERATING A WIND TURBINE HAVING A ROTOR BLADE HEATING DEVICE

CROSS REFERENCE TO RELATED APPLICATION

This application claims priority of European patent application no. 14185606.2, filed Sep. 19, 2014, the entire content of which is incorporated herein by reference.

FIELD OF THE INVENTION

The invention relates to a method for operating a wind turbine in which a current temperature of a rotor blade is determined and a rotor blade heating device is activated and deactivated in dependence upon the determined temperature.

BACKGROUND OF THE INVENTION

Under certain climatic conditions, the rotor blades of wind turbines can ice up. This can lead to a reduction in the aerodynamic efficiency, to increased loading on the wind turbine by imbalances and to a hazard as a result of falling ice. Therefore, different rotor blade heating devices are known with which ice adhering to the rotor blades can be removed (de-icing) or icing up can already be counteracted before it occurs (anti-icing). Precise control of the rotor blade heating device is a significant factor in keeping the energy consumption of the rotor blade heating device low, avoiding overheating of the rotor blade and at the same time bringing about reliable de-icing or avoiding the formation of new ice.

The published European patent application EP 2 626 557 A1 discloses a method for controlling a rotor blade heating device in which the heat losses at the rotor blade are calculated taking into account the ambient temperature, the wind speed and the rotor rotational speed. The operation of the wind turbine is to take place in dependence upon the calculated heat losses. In particular, a rotor blade heating device is to be activated or the rotor rotational speed is to be reduced.

Another method for operating a wind turbine having a rotor blade heating device is disclosed in U.S. Pat. No. 7,182,575 B2. The method relates specifically to the situation in which the wind is calm or there is a very low wind speed. In this case, the generator of the wind turbine is to be used as a motor in order to operate the rotor at a low rotor rotational speed. At the same time, the pitch angle of the rotor blades is to be set in such a way that icing up on the leading edge on which a rotor blade heating device is arranged remains limited.

Another known possibility for controlling a rotor blade heating device uses a plurality of temperature sensors which are arranged on the rotor blade surface. These temperature sensors are used to measure a current temperature of the rotor blade. A rotor blade heating device is then activated and deactivated in dependence upon the measured temperature. In this way, it is possible to keep the rotor blade at a desired temperature. However, the high expenditure which the use of temperature sensors entails is disadvantageous. This applies to the installation of the temperature sensors and, in particular, to their maintenance and possibly necessary repair.

SUMMARY OF THE INVENTION

It is an object of the invention to make available a method for operating a wind turbine in which a current temperature of a rotor blade is determined and a rotor blade heating device is activated and deactivated in dependence upon the determined current temperature, and which method can be executed with relatively simple means, as well as a corresponding wind turbine.

This object is, for example, achieved by a method for operating a wind turbine having a heating device, the method having the following steps:
 determining a current temperature of a rotor blade,
 activating and deactivating a rotor blade heating device in dependence upon the determined current temperature, wherein when the current temperature is determined, the following steps are carried out:
 assuming a temperature starting value,
 calculating a change in temperature taking into account at least one predefined characteristic variable for the temperature behavior of the rotor blade and at least one operating parameter of the wind turbine.

The current temperature of the rotor blade which is determined with the method can basically be any desired temperature which is indicative of icing up of the rotor blade. In particular, it can be a surface temperature of the rotor blade.

The rotor blade heating device can have an electric heating element through which an electric heating current flows, in particular along the longitudinal direction of a rotor blade, when the heating device is activated. The heating element can have an electrically conductive, planar material, for example a fabric or nonwoven made of carbon fibers, in particular in the form of a heating mat.

In the invention, the current temperature of the rotor blade is not determined by a temperature measurement at the rotor blade but instead by a calculation which determines the current temperature by progressive calculation of the change in temperature starting from a temperature starting value. During the calculation of the change in temperature, at least one predefined characteristic variable is taken into account for the temperature behavior of the rotor blade. This characteristic variable is characteristic of the configuration of the rotor blade under consideration and can be used to describe the chronological profile of the temperature of the rotor blade. It is basically possible to determine the characteristic variable on the basis of the geometry and the surface properties and/or material properties of the elements of the rotor blade in model calculations. It is also possible to perform experimental determination of the characteristic variable.

During the calculation of the change in temperature, at least one operating parameter of the wind turbine is also taken into account. This may be, in particular, a parameter which is readily available within a control system of the wind turbine. Of course, further variables, in particular ambient conditions such as, for example, an ambient temperature, an air pressure or moisture of the air, can also be taken into account during the calculation of the change in temperature.

Taking a temperature starting value, based on a plausible assumption, as a basis, the progressive calculation of the change in temperature therefore proceeds successfully by taking into account variables which only have to be determined once or are readily available. A measurement of the current temperature of the rotor blade is not provided with the invention and is also not necessary for correct control of the rotor blade heating device. As a result, it is possible to dispense with the use of temperature sensors on the rotor blade which have a tendency to be susceptible to repair. The configuration of the wind turbine can be significantly simplified. Furthermore, a particularly high level of reliability is achieved during the control of the rotor blade heating device.

In an embodiment, the rotor blade heating device is activated if the determined current temperature is below a predefined minimum temperature. This measure needs to be implemented only when the current operating conditions of the system meet peripheral conditions for the icing up of the rotor blade, in particular in the case of precipitation or when a certain level of moisture in the air is exceeded. Icing up is counteracted through the prompt activation of the rotor blade heating device.

In an embodiment, the rotor blade heating device is deactivated if the determined temperature exceeds a predefined maximum temperature. Through this measure, overheating of the rotor blade and unnecessary consumption of energy of the rotor blade heating device are avoided in a simple way.

In an embodiment, the at least one predefined characteristic variable includes a time constant for the heating behavior and/or cooling behavior of the rotor blade. The time constant relates to an exponential function which describes the profile of the temperature in a certain time interval. This constitutes an important characteristic variable for describing the temperature behavior of the rotor blade.

In an embodiment, the at least one predefined characteristic variable includes a maximum temperature difference which can be achieved with the rotor blade heating device. The maximum temperature difference is the limiting value of the rotor blade temperature which occurs after continuous operation of the rotor blade heating device, minus the ambient temperature. This is a decisive characteristic variable for the temperature profile when the rotor blade heating device is activated.

In an embodiment, the time constant and/or the maximum temperature difference are/is dependent on a wind speed and/or a rotor rotational speed. These refinements take into account the fact that the specified characteristic variables for the temperature behavior of the rotor blade are not fixed values but rather that these values may be dependent on the operating parameters and/or ambient conditions. During the calculation of the change in temperature, the values corresponding to the operating conditions and ambient conditions can be used as the time constant and as the maximum temperature difference in each time interval under consideration. For this purpose, mathematical functions for the respective characteristic variable, which describe the dependence on the wind speed and/or rotational speed, can be used. Alternatively, the respective characteristic variable can be stored as a characteristic diagram or in table form. Taking into account the characteristic variables corresponding to the current operating conditions and/or ambient conditions can increase the accuracy during the calculation of the temperature profile.

In an embodiment, the at least one operating parameter includes a rotor rotational speed. The rotor rotational speed has a large influence on the evolution of the temperature since it is decisive for the flow speed at the rotor blade and therefore for the cooling of the rotor blade by the air. As already explained, the rotor rotational speed can be taken into account, in particular, by selecting the characteristic variables corresponding to the current operating state.

In an embodiment, the at least one operating parameter includes a state of the rotor blade heating device. The state can be a current electrical power of the rotor blade heating device or the operation of the rotor blade heating device with a specific power level (NTC). It is also possible to take into account on/off information. The specified states also have a significant influence on the evolution of the temperature of the rotor blade.

In an embodiment, the assumed temperature starting value corresponds to a measured ambient temperature. This assumption supposes that the rotor blade and surroundings are in thermal equilibrium. It is plausible in many cases, in particular if the rotor blade heating device was inactive for a relatively long time period.

In an embodiment, the rotor blade heating device is deactivated for a predefined time period at predefined time intervals and subsequently the ambient temperature is assumed as the temperature starting value. This process can be carried out, for example, once per day. The predefined time period for which the rotor blade heating device is deactivated can be, for example, two time constants long or more. In this way, a plausible temperature starting value, which can serve as a basis for the further calculations, is determined at regular intervals.

In an embodiment, the rotor blade heating device is activated for a predefined time period and subsequently the ambient temperature plus a maximum temperature difference, which can be achieved with the rotor blade heating device, is assumed as the temperature starting value. The process can also be repeated at predefined time intervals, for example once a day. The predefined time period can be, for example, two time constants or more. In this way, a plausible temperature starting value is also made available. This procedure is suitable in particular for low ambient temperatures at which undesired icing up of the rotor blade would have to be expected with the alternatively possible deactivation of the rotor blade heating device for a predefined time period.

In an embodiment, the rotor blade heating device is activated in a plurality of different power stages, wherein the at least one characteristic variable, which is taken into account during the calculation of the change in temperature, for the temperature behavior of the rotor blade is dependent on an activated power level. In particular, a maximum temperature difference which can be achieved at the respective activated power level can be selected.

In an embodiment, the current temperature is determined for a plurality of predefined points on the rotor blade. The characteristic variables used in this case for the temperature behavior of the rotor blade can then be related specifically to the predefined points. In particular, those points at which temperature sensors were provided on conventional rotor blades which were otherwise of the same configuration can be included in the evaluation. It is then possible to have recourse to empirical values during the control of the rotor blade heating device.

In an embodiment, during the activation of the rotor blade heating device that point for which the lowest temperature has been determined is evaluated, and/or during the deactivation of the rotor blade heating device that point for which the highest temperature has been determined is evaluated. In this way, a maximum temperature is prevented from being exceeded, and a minimum temperature is prevented from being undershot, at all the points on the rotor blade.

The abovementioned object is also achieved via a wind turbine having a rotor blade heating device and a controller which can activate and deactivate the rotor blade heating device in dependence upon a determined current temperature of a rotor blade, wherein the controller is configured to carry out the following steps in order to determine the current temperature:

assuming a temperature starting value,
calculating a change in temperature taking into account at least one predefined characteristic variable for the temperature behavior of the rotor blade and at least one operating parameter of the wind turbine.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
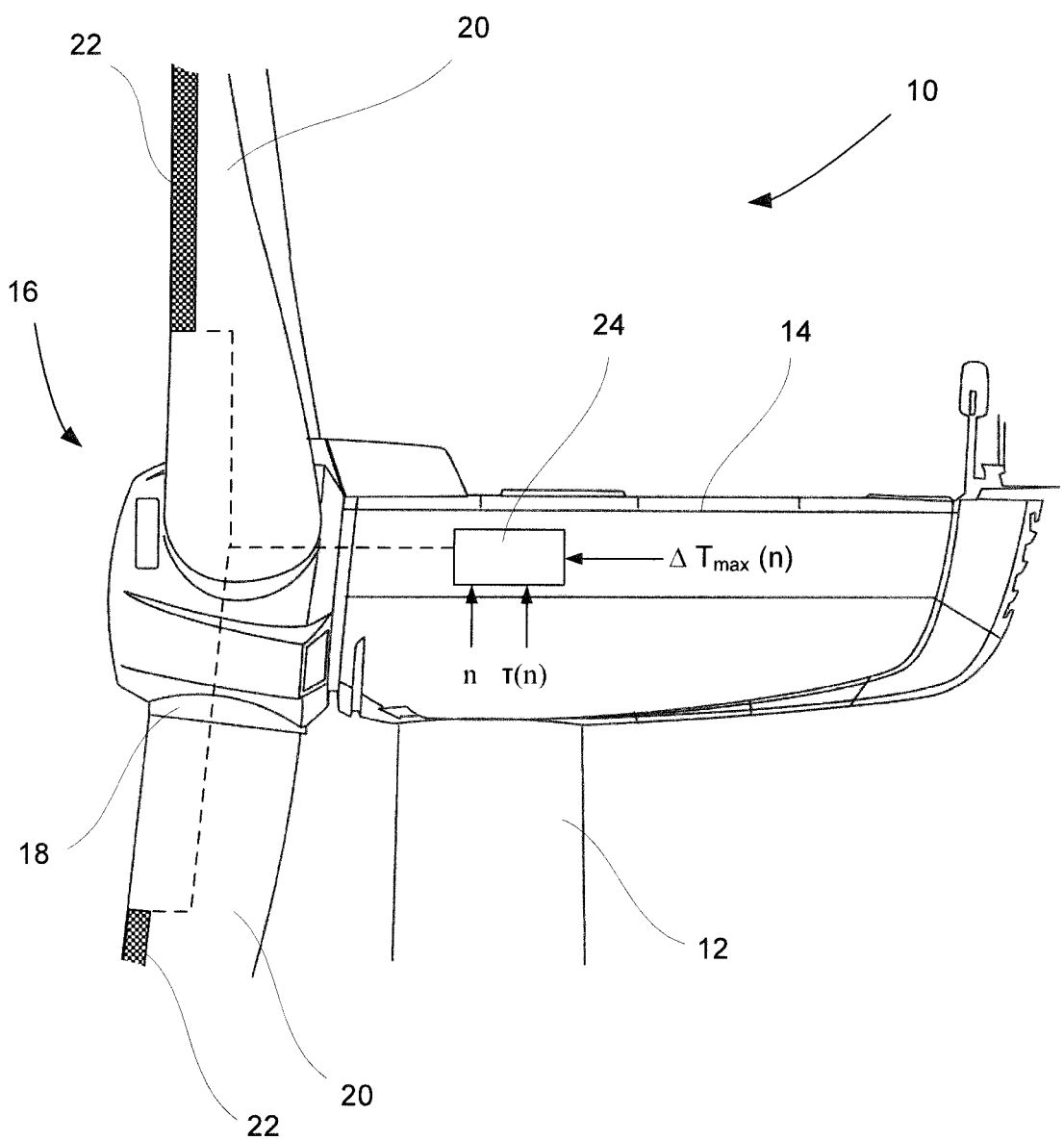
FIG. 1 is a simplified illustration of a wind turbine according to the invention.

FIG. 1 shows a wind turbine 10 which has a tower 12, a gondola 14 and a rotor 16. The rotor 16 has a rotor hub 18 to which a plurality of rotor blades 20 are attached. Each of the rotor blades 20 has a rotor blade heating device 22. Located in the gondola 14 is a controller 24 which is configured to activate and to deactivate the rotor blade heating devices 22. This is indicated only schematically by the dashed lines.

The controller 24 is also configured to determine a current temperature of a rotor blade. This can be done separately for each of the rotor blades 20 which are present or jointly for all the rotor blades 20 which are present. The controller 24 activates and deactivates the rotor blade heating devices 22 in dependence upon the determined current temperature.

In order to determine the current rotor blade temperature, the controller 24 does not make any use of temperature sensors arranged on the rotor blades 20. Instead, the controller 24 assumes a plausible temperature starting value $T_{start}$ and continuously calculates a change in temperature. In this context, the controller 24 takes into account a maximum temperature difference $\Delta T_{max}(n)$ and a time constant $\tau(n)$ as predefined characteristic variables for the temperature behavior of the rotor blades 22. These two characteristic variables depend, for their part, on the rotor rotational speed n. Furthermore, the controller 24 takes into account a rotor rotational speed n, which is an operating parameter of the wind turbine 10, during the calculation of the change in temperature.

Further details of the method according to the invention are explained with reference to FIG. 2. The profile of the ambient temperature $T_U$ and the profile of the determined current temperature $T_{curr}$ of the rotor blades 20 are plotted in the diagram.

At the time $t_1$, the ambient temperature $T_U$ is assumed as the temperature starting value. From then on, the change in temperature is calculated continuously. The current temperature of the rotor blade which is determined in this way is $T_{curr}$ of the rotor blade which is determined in this way is entered via dots in the diagram. The temperature $T_{curr}$ is composed of a plurality of time segments, which are explained as follows.

At the time $t_1$, the rotor blade heating device 22 had been inactive for a relatively long time period. The assumption that the temperature of the rotor blade corresponds to the temperature of the ambient air is therefore plausible, with the result that the ambient temperature $T_U$ can be assumed as the temperature starting value $T_{start}$. At the time $t_1$, the determined current temperature $T_{curr}$ of the rotor blade is within the aimed-at temperature range between a minimum temperature $T_{min}$ and a maximum temperature $T_{max}$. The rotor blade heating device therefore remains inactive and the change in temperature of the rotor blade essentially follows the ambient temperature.

At the time $t_2$, the current temperature $T_{curr}$ of the rotor blades 20, which is determined in this manner, drops below the minimum temperature $T_{min}$, with the result that the rotor blade heating device 22 is activated by the controller 24 at this time. In the example, a heating power is selected which corresponds to a third of the maximum heating power of the rotor blade heating device. This power level is assigned a maximum temperature difference $\Delta T_{max,1}$, dependent on the rotor rotational speed n, as the characteristic variable for the temperature behavior. During the heating, the calculation is based on an exponential increase in the temperature, wherein the following formula applies for the change in temperature:

$$\Delta T(t) = \Delta T_{max,1} \cdot (1 - e^{-(t-t_2)/\tau})$$

The time constant t contained in the formula is a further characteristic variable, itself dependent on the rotor rotational speed n, for the temperature behavior of the rotor blades 20.

At the time $t_3$, the determined temperature of the rotor blade has risen to the maximum temperature $T_{max}$, with the result that the rotor blade heating device 22 is deactivated. Up to the time $t_4$, there is then a further adjoining phase in which the rotor blades 20 cool down. An exponential decrease in temperature toward the ambient temperature $T_U$ is assumed for this again.

At the time $t_4$, the determined current temperature $T_{curr}$ of the rotor blade drops below the minimum temperature $T_{min}$ again and the rotor blade heating device is therefore activated again, once more with the power level which was already activated at the time $t_2$ in the example.

At the time $t_5$, the maximum temperature $T_{max}$ is reached again and the rotor blade heating device 22 is correspondingly deactivated up to the time $t_6$ at which the determined current temperature $T_{curr}$ of the rotor blade drops below the minimum temperature $T_{min}$ again.

At the time $t_6$, the rotor blade heating device 22 is activated with its maximum power stage in the example. The power level is assigned a maximum temperature difference $\Delta T_{max,2}$ which is greater than $\Delta T_{max,1}$, with the result that an exponential function which rises more steeply results. The determined current temperature $T_{curr}$ follows this function until at the time $t_7$ the maximum temperature $T_{max}$ is reached again and the rotor blade heating device 22 is deactivated. There follows a further cooling phase.

Figure 3:
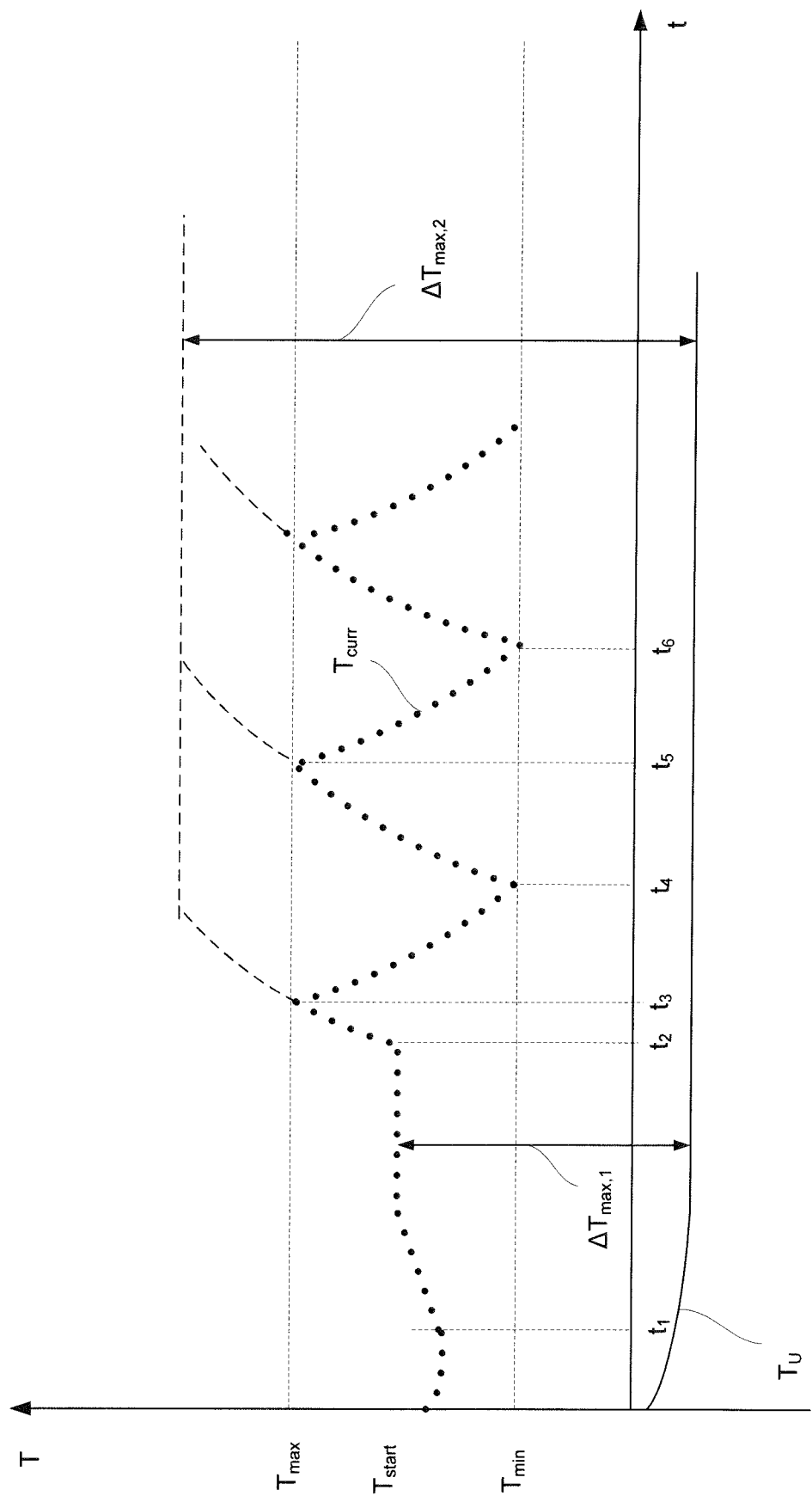

FIG. 3 shows a further embodiment of the method according to the invention. The ambient temperature $T_U$ is in a range below 0° C. It is not possible to switch off the rotor blade heating device 22 in order to set the temperature starting value $T_{start}$ to the ambient temperature $T_U$, since the rotor blade would ice up.

The rotor blade heating device 22 is activated at the time $t_1$ and operated at a low heating level, with the result that up to the time $t_2$ a temperature $T_{start}$ is set. This temperature corresponds to the ambient temperature $T_U$ plus the temperature difference $\Delta T_{max,1}$, which can be reached at maximum with the low heating level. $T_{start}$ is in the aimed-at temperature range between $T_{min}$ and $T_{max}$.

Figure 2:
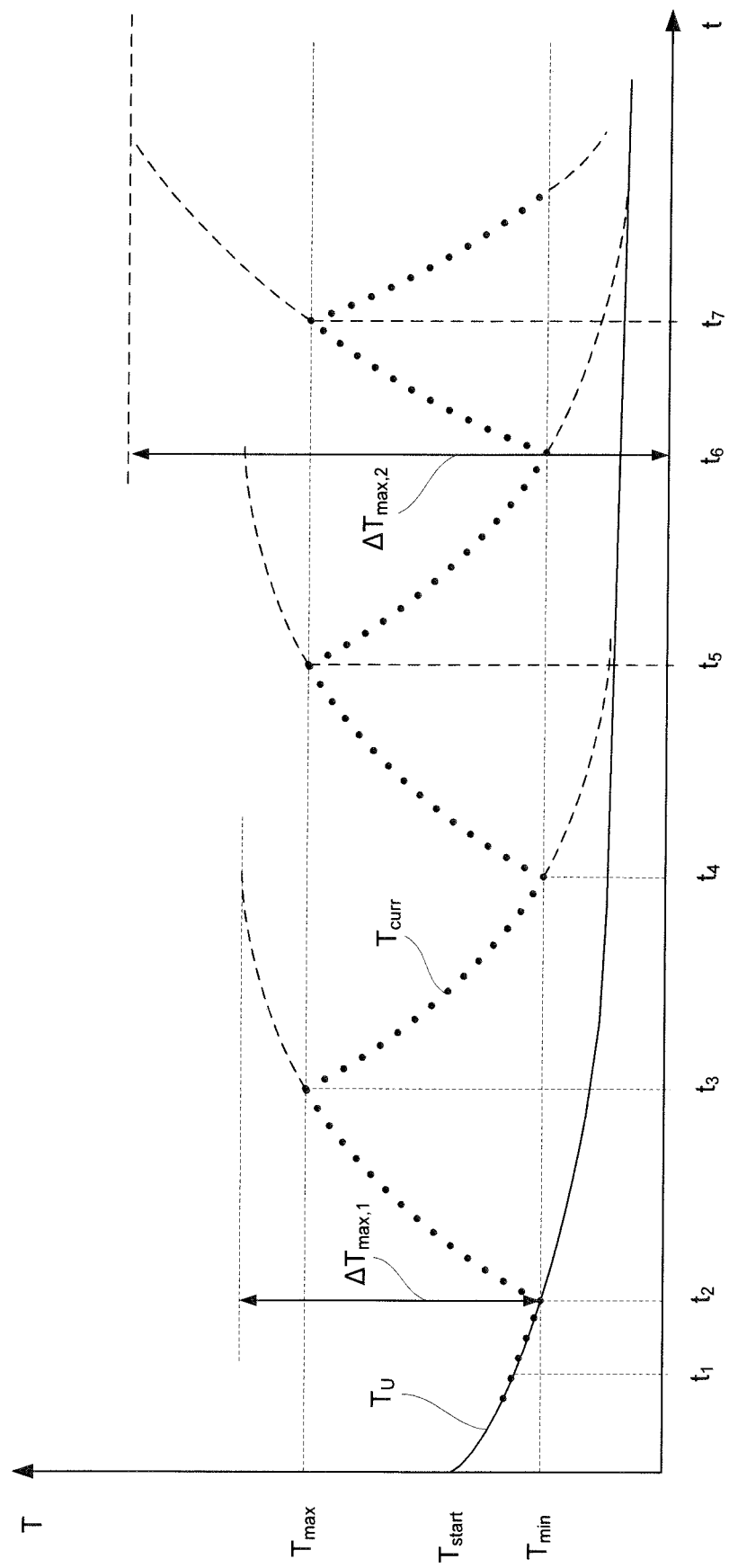
FIG. 2 is a diagram relating to the profile of the temperature on a rotor blade; and, FIG. 3 is a further diagram relating to the profile of the temperature on a rotor blade.

Starting from the time $t_2$, the current rotor blade temperature $T_{curr}$ is determined in accordance with the example in FIG. 2. At the time $t_2$, the rotor blade heating device 22 is activated with the highest power level. At the time $t_3$, the maximum temperature $T_{max}$ is reached and the rotor blade heating device 22 is accordingly deactivated up to the time $t_4$ at which the determined current temperature $T_{curr}$ of the rotor blade drops below the minimum temperature $T_{min}$ again. Further heating and cooling phases follow accordingly.

It is understood that the foregoing description is that of the preferred embodiments of the invention and that various changes and modifications may be made thereto without departing from the spirit and scope of the invention as defined in the appended claims.

LIST OF REFERENCE SYMBOLS USED

10 Wind turbine
12 Tower
14 Gondola
16 Rotor
18 Rotor hub
20 Rotor blade
22 Rotor blade heating device
24 Controller
$T_{start}$ Temperature starting value
$\tau$ Time constant
n Rotor rotational speed
$T_U$ Ambient temperature
$T_{min}$ Minimum temperature
$T_{max}$ Maximum temperature
$\Delta T_{max,1}$ Maximum temperature difference at power level 33%
$\Delta T_{max,2}$ Maximum temperature difference at full power
$T_{curr}$ Current rotor blade temperature

What is claimed is:

1. A method for operating a wind turbine having at least one rotor blade, the method comprising the steps of:
   determining a current temperature ($T_{curr}$) of the rotor blade by:
   (a) assuming a temperature starting value ($T_{start}$) for the temperature of the rotor blade, and
   (b) calculating a change in temperature of the rotor blade by taking into account at least one predefined characteristic variable for the temperature behavior of the rotor blade and at least one operating parameter of the wind turbine; and,
   activating and deactivating a rotor blade heating device in dependence upon the determined current temperature ($T_{curr}$).

2. The method of claim 1, wherein the rotor blade heating device is activated when the determined current temperature ($T_{curr}$) drops below a predefined minimum temperature ($T_{min}$).

3. The method of claim 1, wherein the rotor blade heating device is deactivated when the determined current temperature ($T_{curr}$) exceeds a predefined maximum temperature ($T_{max}$).

4. The method of claim 1, wherein the at least one predefined characteristic variable includes a time constant ($\tau$) for at least one of the heat-up behavior of the rotor blade and the cool-down behavior of the rotor blade.

5. The method of claim 1, wherein the at least one predefined characteristic variable includes a maximum temperature difference ($\Delta T_{max,1}$, $\Delta T_{max,2}$) which can be achieved with the rotor blade heating device.

6. The method of claim 5, wherein
   the at least one predefined characteristic variable further includes a time constant ($\tau$) for at least one of the heat-up behavior of the rotor blade and the cool-down behavior of the rotor blade; and,
   the at least one of the time constant ($\tau$) and the maximum temperature difference ($\Delta T_{max,1}$, $\Delta T_{max,2}$) is dependent on at least one of a wind speed and a rotor rotational speed (n).

7. The method of claim 1, wherein the at least one operating parameter includes a rotational speed (n).

8. The method of claim 1, wherein the at least one operating parameter includes a state of the rotor blade heating device.

9. The method of claim 1, wherein the assumed temperature starting value ($T_{start}$) corresponds to a measured ambient temperature ($T_U$).

10. The method of claim 9, wherein the rotor blade heating device is deactivated for a predefined time period at predefined time intervals and subsequently the ambient temperature ($T_U$) is assumed as the temperature starting value ($T_{start}$).

11. The method of claim 1, wherein the rotor blade heating device is activated in a plurality of different power stages, and, wherein the at least one characteristic variable for the temperature behavior of the rotor blade, which is taken into account during the calculation of the change in temperature, is dependent on an activated one of said power stages.

12. The method of claim 1, wherein the current temperature ($T_{curr}$) is determined for a plurality of predefined points on the rotor blade.

13. The method of claim 12 further comprising the step of evaluating the point for which the lowest temperature has been determined during the activation of the rotor blade heating device.

14. The method of claim 12 further comprising the step of evaluating the point for which the highest temperature has been determined during the deactivation of the rotor blade heating device.

15. The method of claim 12 further comprising the steps of:
   evaluating the point for which the lowest temperature has been determined during the activation of the rotor blade heating device; and,
   evaluating the point for which the highest temperature has been determined during the deactivation of the rotor blade heating device.

16. A method for operating a wind turbine having at least one rotor blade, the method comprising the steps of:
   determining a current temperature ($T_{curr}$) of the rotor blade by:
   (a) assuming a temperature starting value ($T_{start}$) for the temperature of the rotor blade, and
   (b) calculating a change in temperature of the rotor blade by taking into account at least one predefined characteristic variable for the temperature behavior of the rotor blade and at least one operating parameter of the wind turbine; and,
   activating and deactivating a rotor blade heating device in dependence upon the determined current temperature ($T_{curr}$), wherein the rotor blade heating device is activated for a predefined time period and subsequently an ambient temperature ($T_U$) plus a maximum temperature difference ($\Delta T_{max,1}$, $\Delta T_{max,2}$), which can be achieved with the rotor blade heating device, is assumed as the temperature starting value ($T_{start}$).

17. A wind turbine comprising:
a rotor blade;
a rotor blade heating device;
a controller configured to activate and deactivate said rotor blade heating device in dependence upon a determined current temperature ($T_{curr}$) of a rotor blade; and, said controller being further configured to assume a temperature starting value ($T_{start}$) for the temperature of the rotor blade and to calculate a change in temperature taking into account at least one predefined characteristic variable for the temperature behavior of said rotor blade and at least one operating parameter of said wind turbine in order to determine the current temperature ($T_{curr}$).

* * * * *